United States Patent [19]

Uchiyama

[11] Patent Number: 5,706,418
[45] Date of Patent: Jan. 6, 1998

[54] APPARATUS PERFORMING VERTICAL AND HORIZONTAL MAPPING OF TEXTURE ON POLYGONAL AREA OF DISPLAYED OBJECT

[75] Inventor: Toshimi Uchiyama, Hamamatsu, Japan

[73] Assignee: Yamaha Corporation, Hamamatsu, Japan

[21] Appl. No.: 412,985

[22] Filed: Mar. 28, 1995

[30] Foreign Application Priority Data

Mar. 29, 1994 [JP] Japan .................. 6-082463

[51] Int. Cl.$^6$ .................................................. G06T 15/00
[52] U.S. Cl. .................................. 395/130; 395/125
[58] Field of Search .................... 395/119–123, 125–132

[56] References Cited

U.S. PATENT DOCUMENTS

| | | | |
|---|---|---|---|
| 4,935,879 | 6/1990 | Ueda | 395/125 |
| 5,179,638 | 1/1993 | Dawson et al. | 395/125 |
| 5,550,960 | 8/1996 | Shirman et al. | 395/119 X |

FOREIGN PATENT DOCUMENTS 6080375  4/1988  Japan .

*Primary Examiner*—Almis R. Jankus
*Attorney, Agent, or Firm*—Loeb & Loeb LLP

[57] ABSTRACT

A texture mapping apparatus graphically applies a texture pattern to a polygonal area of an object presented in a display plane. A memory is defined with a texture plane corresponding to the display plane for recording in the texture plane pattern data representative of the texture pattern. A zone operator truncates the polygonal area sequentially in a longitudinal direction to determine a set of parallel zones which extend along a lateral direction in the display plane, and to subsequently determine a set of corresponding zones in the texture plane. A segment operator interpolatively divides one parallel zone to determine a stripe of lateral segments, and to subsequently determine a group of corresponding segments within the corresponding zone of the texture plane. A point operator interpolatively divides each of the lateral segments to determine an array of display points arranged within the polygonal area in the display plane, and to subsequently determine an array of texture points in the texture plane, corresponding to the display points. An allocator reads out the pattern data recorded at the respective texture points from the memory, and allocates the read pattern data to the corresponding display points to thereby map the texture pattern to the polygonal area.

5 Claims, 7 Drawing Sheets

APPARATUS PERFORMING VERTICAL AND HORIZONTAL MAPPING OF TEXTURE ON POLYGONAL AREA OF DISPLAYED OBJECT

BACKGROUND OF THE INVENTION

The present invention relates to a texture mapping apparatus for graphically applying a desired texture pattern to a surface of a three-dimensional object presented in a two-dimensional display in a three-dimensional graphic system or else.

An important application field of computer graphics is to create a realistic image of a three-dimensional object. For example, in design process of a new product, generally a model object should be visually presented for evaluation thereof. The image presentation of the object by the computer graphics is superior to the actual making of a prototype or model of the object in order to readily evaluate the design at low costs and further to extensively deal with modifications.

A texture is a significant element to impart a realistic appearance to the three-dimensional or solid object on the display. The texture is a representation of the detailed structure of the object surface and has two significant aspects. The one aspect is to add a roughness to the object surface. The other aspect is to superpose a separately prepared texture pattern on a plain surface of the solid object. The object surface is still viewed in a smooth appearance after the texture pattern is applied thereto. This is a graphical transfer operation called "texture mapping" which is executed by a computerized texture mapping apparatus.

A conventional type of texture mapping apparatus divides the object surface into triangular or convex tetragonal sections, then linearly interpolates each section between opposed sides thereof to determine line segments contained in the section, and lastly linearly interpolates each line segment to determine address points in a display plane of the object. The apparatus further determines a corresponding address point in a texture memory to read out therefrom a pattern data which is then allocated to the corresponding address point of the display plane. Such a conventional texture mapping apparatus is disclosed in, for example, Japanese Patent Application Laid-Open No. 63-80375 (1988). However, the conventional apparatus is limited to treat only a texture mapping area of the triangular or convex tetragonal figure. Therefore, a pre-stage processor must be provided to provisionally divide an original polygonal face of the object into a plurality of the triangular or convex tetragonal sections, resulting in an increase in work load on processors. Further, the conventional apparatus treats a set of line segments interpolated in diverse directions. Therefore, the linear interpolation must be applied to numerous diagonal line segments, which would cause a loss of pixels or dots. The interpolation or division rate must be raised to avoid such a loss of dots. However, an excessive or close interpolation would adversely cause duplicate computation of the same dot to thereby hinder data processing speed.

SUMMARY OF THE INVENTION

In order to solve the above noted drawbacks of the prior art, an object of the present invention is to provide a texture mapping apparatus which can map a texture pattern on an arbitrary polygonal area of a solid object at a faster speed. Another object of the invention is to provide a texture mapping apparatus which can uniformly map the texture pattern over a displayed surface of the object.

According to the invention, a texture mapping apparatus graphically applies a texture pattern to a polygonal area of an object presented in a display plane. The apparatus comprises memory means defined therein with a texture plane corresponding to the display plane for recording in the texture plane a pattern data representative of the texture pattern, interpolation means for executing an interpolative operation of a figure data representative of the polygonal area in vertical and horizontal directions of the display plane to calculate display points distributed within the polygonal area and for executing a linear interpolative operation to determine texture points of the texture plane corresponding to the display points of the display plane, and allocation means for reading out the pattern data recorded at the respective texture points from the memory means and for allocating the read pattern data to the corresponding display points to thereby map the texture pattern to the polygonal area. In a specific form, the interpolation means comprises selection means for processing a figure data representative of the polygonal area bounded by a plurality of sides to select a pair of sides which at least partly lie at a common vertical position in the display plane to define a closed horizontal zone limited by the selected pair of the sides and to subsequently select a pair of corresponding sides in the texture plane to define a corresponding closed zone, vertical interpolation means for vertically interpolating the closed horizontal zone to produce a set of horizontal segments extending between the selected sides in the display plane and to subsequently determine a set of corresponding segments contained in the corresponding closed zone of the texture plane, and horizontal interpolation means for horizontally interpolating each of the horizontal segments to produce display points distributed within the polygonal area in the display plane and to subsequently determine texture points corresponding to the display points in the texture plane. Alternatively, the interpolation means may perform a horizontal interpolation of a closed vertical zone to determine a set of vertical segments in the display plane, and perform a vertical interpolation of each vertical segment to determine display points distributed within the polygonal area, instead of performing the vertical interpolation to determine the set of the horizontal segments and performing the horizontal interpolation of each horizontal segment to determine the display point within the polygonal area. In a preferred form, the interpolation means sets a division pitch of the horizontal and vertical interpolations identically to a row and column pitch of pixels or dots so that the display points correspond to the dots in one-to-one basis.

In another aspect of the invention, a texture mapping apparatus graphically applies texture pattern to a polygonal area of an object presented in a display plane which is defined to extend in lateral and longitudinal directions orthogonal to each other. The apparatus comprises memory means defined therein with a texture plane corresponding to the display plane for recording in the texture plane a pattern data representative of the texture pattern, zone operation means for truncating the polygonal area sequentially in the longitudinal direction to determine a set of parallel zones which extend along the lateral direction in the display plane and to subsequently determine a set of corresponding zones in the texture plane, segment operation means for interpolatively dividing each of the parallel zones in the longitudinal direction to determine a stripe of lateral segments which lie along the lateral direction within each parallel zone of the display plane and to subsequently determine a group of corresponding segments within the corresponding zone of the texture plane, point operation means for interpolatively dividing each of the lateral segments in the lateral direction to determine an array of display points arranged within the polygonal area in the display plane and to subsequently determine an array of texture points in the texture plane corresponding to the display points, and allocation means for reading out the pattern data recorded at the respective texture points from the memory means and for allocating the read pattern data to the corresponding display points to thereby map the texture pattern to the polygonal area.

According to the invention, the interpolation means calculates the display points which exist within the polygonal area by the horizontal and vertical interpolations. The allocation means reads out from the memory means the texture data recorded in the texture plane at the texture points corresponding to the calculated display points. The read texture data is allocated to the display points in the display plane. The interpolation is conducted always in the fixed horizontal and vertical directions coincident with the row and column directions of the pixels or dots. Therefore, the display points can be computed correspondingly to the dots on the display plane to avoid redundant or duplicate computation to thereby raise the data processing efficiency. Particularly, first the vertical interpolation is carried out to produce the set of the horizontal segments which are then horizontally interpolated to determine the display points. In such a case, the corresponding texture points can be sequentially computed in synchronization with raster scanning of a CRT display to thereby realize a real time processing. Further, according to the invention, the selection means selects a pair of opposed sides from the convex polygonal area of the displayed object to determine the closed zone which is parallel to one of the horizontal and vertical directions and which is limited by the selected pair of the sides. Then, the closed zone is processed by the horizontal and vertical interpolation means. Accordingly, the inventive apparatus can treat not only specific triangular and convex tetragonal figures, but also a general polygonal figure. The inventive apparatus does not require a provisional dividing operation of the figure into triangular or tetragonal sections to thereby further increase the processing speed. Moreover, according to the invention, the display points are computed by the horizontal and vertical interpolations applied to the polygonal area in the display plane so that the texture pattern can be mapped uniformly over the display plane. Additionally, the interpolation pitch can be set identical to the dot pitch of the display to thereby achieve perfect texture mapping free of dot loss or omission.

DETAILED DESCRIPTION OF EMBODIMENTS

Figure 2A:
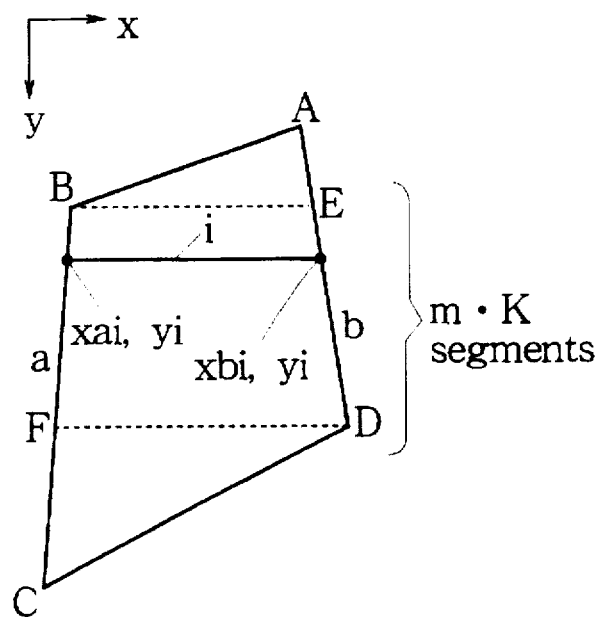
FIGS. 2A and 2B are illustrative diagrams showing vertical interpolative operation by the inventive apparatus.
Figure 2B:
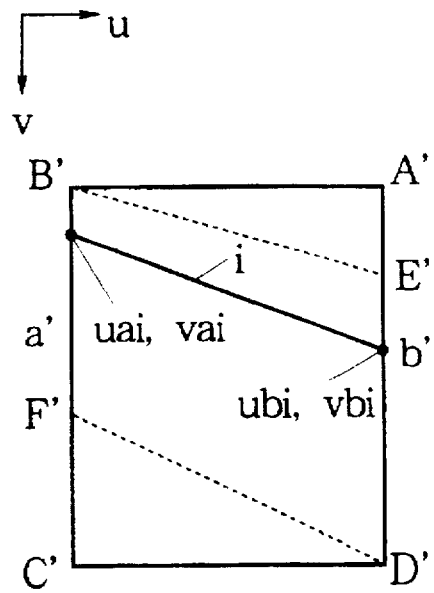

Hereinafter, preferred embodiments of the invention will be described with reference to the attached drawings. Referring to FIGS. 2A, 2B, 3A and 3B, description is given for an outline of the texture mapping according to the invention. A display plane is defined in a frame memory on an orthogonal x-y coordinates system as shown in FIG. 2A. A corresponding texture plane is defined in a texture memory on another orthogonal u-v coordinates system as shown in FIG. 2B. The display plane contains a convex polygonal area exemplified by a convex tetragonal area ABCD which constitutes one tiny face of a three-dimensional object. A pair of sides a (segment BC) and b (segment AD) are selected for processing since the pair of the selected sides a and b at least partly lie at the same vertical position in the display plane. Stated otherwise, the pair of sides a and b are opposed to each other in the horizontal or lateral direction. The one side a has a pair of end points B and C denoted by x-y coordinates (xas, yas) and (xae, yae), respectively. The other side b has a pair of end points A and D denoted by x-y coordinates (xbs, ybs) and (xbe, ybe), respectively. These four end points (vertexes) B, C, A and D are assigned with density data or luminance data Ias, Iae, Ibs and Ibe, respectively.

Further, as shown in FIG. 2B, another pair of sides a' and b' are determined in the texture plane correspondingly to the selected pair of the sides a and b. The one corresponding side a' has two end points B' and C' denoted by u-v coordinates (uas, vas) and (uae, vae), respectively. The other corresponding side b' has two end points A' and D' denoted by u-v coordinates (ubs, vbs) and (ube, vbe), respectively.

Referring back to FIG. 2A, the pair of the opposed sides a and b are selected to determine a closed horizontal or lateral zone having a trapezoidal shape BFED which is obtained by truncating the initial tetragonal area BCAD. The trapezoid BFED has a pair of diagonal sides BF and ED which coincide partly with the selected sides a and b, respectively. The trapezoid BFED has a pair of parallel sides BE and FD which coincide with horizontal truncation lines passing through the end points B and D of the selected sides a and b, and which terminate by the selected sides a and b. Thus, the trapezoid BFED has at least two vertexes B and D coincident with two of the four end points B, C, A and D of the two selected sides a and b. The four vertexes B, F, E and D of the trapezoid are denoted by x-y coordinates (xal, yl), (xah, yh), (xbl, yl) and (xbh, yh), respectively. These x-y coordinates are computed according to the following formulae (1) based on the x-y coordinates of the end points of the selected sides a and b.

$$\begin{aligned} xal &= xas \\ xah &= xas + (xae - xas)(ybe - yas)/(yae - yas) \\ xbl &= xbe - (xbe - xbs)(ybe - yas)/(ybe - ybs) \\ xbh &= xbe \\ yl &= yas \\ yh &= ybe \end{aligned} \qquad (1)$$

Referring again to FIG. 2B, a closed diagonal zone B'F'E'D' having a tetragonal shape is defined in the texture plane correspondingly to the closed trapezoidal zone BFED. The vertexes B', F', E' and D' of the corresponding tetragonal zone are denoted by u-v coordinates (ual, val), (uah, yah), (ubl, vbl) and (ubh, vbh), respectively. These u-v coordinates are computed according to the following formulae (2).

$$\left.\begin{array}{rcl} ual &=& uas \\ uah &=& uas + (uae - uas)(ybe - yas)/(yae - yas) \\ ubl &=& ube - (ube - ubs)(ybe - yas)/(ybe - ybs) \\ ubh &=& ube \\ val &=& vas \\ vah &=& vas + (vae - vas)(ybe - yas)/(yae - yas) \\ vbl &=& vbe - (vbe - vbs)(ybe - yas)/(ybe - ybs) \\ vbh &=& vbe \end{array}\right\} \quad (2)$$

Further, interpolative computation is conducted to calculate luminance values Ial, Iah, Ibl and Ibh at the vertex points, B, F, E and D of trapezoidal zone according to the following formulae (3).

$$\left.\begin{array}{rcl} Ial &=& Ias \\ Iah &=& Ias + (Iae - Ias)(ybe - yas)/(yae - yas) \\ Ibl &=& Ibe - (Ibe - Ibs)(ybe - yas)/(ybe - ybs) \\ Ibh &=& Ibe \end{array}\right\} \quad (3)$$

Referring further to FIG. 2A, the trapezoidal zone BFDE is interpolatively divided in the vertical or longitudinal direction to determine a stripe of horizontal or lateral segments i, a number of which is denoted by m·K where m denotes a desired constant and K denotes a number of vertical pixels or dots (yh-yl) aligned vertically between the parallel sides of the trapezoid BFDE. Specifically, the selected pair of the sides a and b are linearly interpolated in the vertical direction to calculate the horizontal segments i (i=1, 2, 3, ... ). Each horizontal segment i is identified in the display plane by a pair of end points denoted by x-y coordinates (xai, yi) and (xbi, yi), respectively. A corresponding pair of end points in the texture plane is denoted by u-v coordinates (uai, vai) and (ubi, vbi), respectively. Furthers the luminance data Iai and Ibi are assigned to the opposite end points of the horizontal segment i. These coordinate values and the luminance values are interpolatively computed according to the following formulae (4).

$$\left.\begin{array}{rcl} yi &=& yl + i/m \\ xai &=& xal + i(xah - xal)/mK \\ uai &=& ual + i(uah - ual)/mK \\ vai &=& val + i(vah - val)/mK \\ Iai &=& Ial + i(Iah - Ial)/mK \\ xbi &=& xbh - (mK - i)(xbh - xbl)/mK \\ ubi &=& ubh - (mK - i)(ubh - ubl)/mK \\ vbi &=& vbh - (mK - i)(vbh - bvl)/mK \\ Ibi &=& Ibh - (mK - i)(Ibh - Ibl)/mK \end{array}\right\} \quad (4)$$

The above formulae (4) are converted into the following formulae (5) by using the previous formulae (1), (2) and (3).

$$\left.\begin{array}{rcl} yi &=& yas + i/m \\ xai &=& xas + i(xae - xas)/m(yae - yas) \\ uai &=& uas + i(uae - uas)/m(yae - yas) \\ vai &=& vas + i(vae - vas)/m(yae - yas) \\ Iai &=& Ias + i(Iae - Ias)/m(yae - yas) \\ xbi &=& xbe - \{m(ybe - yas) - i\}(xbe - xbs)/m(ybe - ybs) \\ ubi &=& ube - \{m(ybe - yas) - i\}(ube - ubs)/m(ybe - ybs) \\ vbi &=& vbe - \{m(ybe - yas) - i\}(vbe - vbs)/m(ybe - ybs) \\ Ibi &=& Ibe - \{m(ybe - yas) - i\}(Ibe - Ibs)/m(ybe - ybs) \end{array}\right\} \quad (5)$$

Figure 3A:
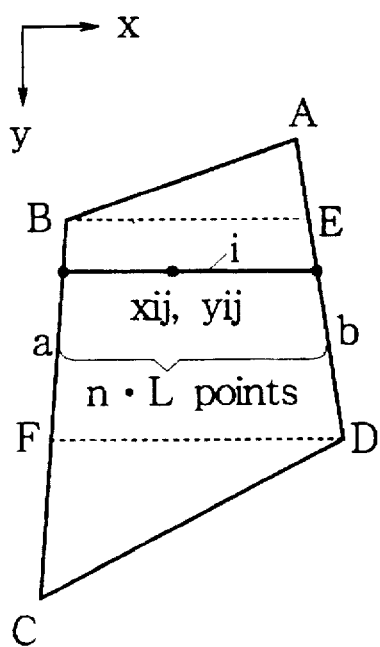
FIGS. 3A and 3B are illustrative diagrams showing horizontal interpolative operation by the inventive apparatus.
Figure 3B:
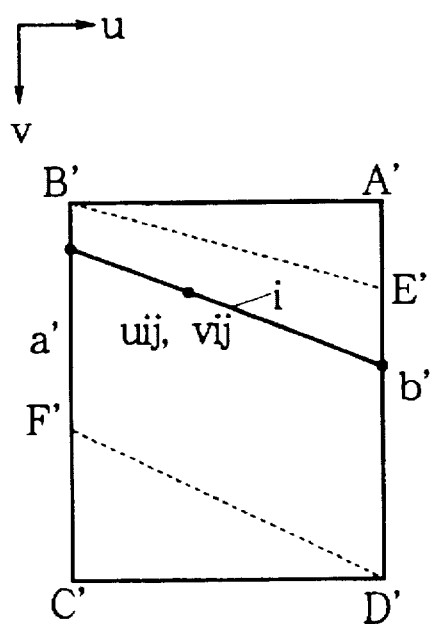

Referring next to FIG. 3A, linear interpolative operation is conducted to horizontally divide each of the thus obtained horizontal segments i into n·L number of display points where n denotes a desired constant and L denotes a number of horizontal pixels (xbi-xai) aligned on the horizontal segment. The corresponding segments in the texture plane are also interpolatively divided into the n·L number of texture points. Specifically, the following formulae (6) are utilized to compute x-y coordinate values xij and yij (i,j=1, 2, 3, ... ) of the respective display points arranged or distributed in the trapezoidal zone BFED, u-v coordinate values uij and vii of the corresponding texture points in the texture plane, and interpolated luminance value Iij of the respective display points.

$$\left.\begin{array}{rcl} yij &=& yi \\ xij &=& xai + j(xbi - xai)/nL \\ uij &=& uai + j(ubi - uai)/nL \\ vij &=& vai + j(vbi - vai)/nL \\ Iij &=& Iai + j(Ibi - Iai)/nL \end{array}\right\} \quad (6)$$

Lastly, the texture pattern memory is addressed to read out a pattern data recorded at the texture points (uij, vii) in the texture plane. The read pattern data is allocated to the corresponding display points (xij, yij) of the display plane, where the pattern data is mixed with the luminance data Iij on a point by point basis, thereby mapping the texture pattern to the polygonal area of the displayed object. Preferably, the constants m and n are set to "1" so as to calculate the array of the display points in one-to-one correspondence to the matrix of the pixels to avoid a loss of dots.

It should be noted that the above listed formulae (1)–(6) should be slightly modified dependent on a relative geometrical relationship between the selected pair of sides a and b of the polygonal area. Modified formulae can be readily derived in an analogous manner. Therefore, in practice, different sets of the interpolative formulae are provisionally prepared for various geometrical combinations of the selected sides a and b.

Figure 1:
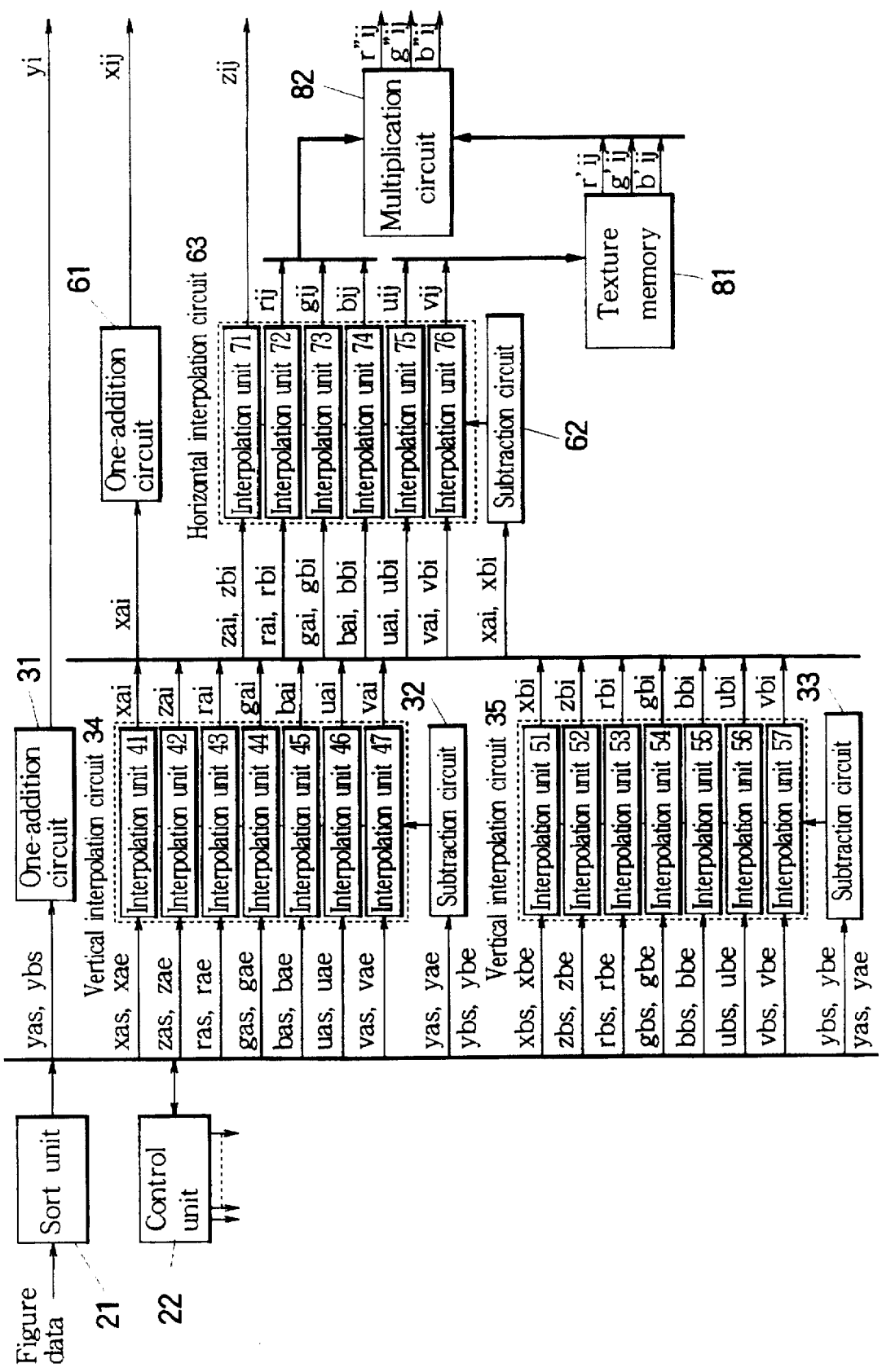
FIG. 1 is a block diagram showing one embodiment of the inventive texture mapping apparatus.

FIG. 1 is a block diagram showing one embodiment of the inventive texture mapping apparatus. The present apparatus has a sort unit 21 which receives figure data representative of a polygonal area of the displayed solid object, and which receives vertex coordinate values x, y of the polygonal area in the display plane, corresponding vertex coordinate values u, v in the texture plane, and color code values r, g, b at the respective vertexes of the polygonal area. The sort unit 21 sorts the vertex points in terms of their vertical coordinate values vertical heights from lower to higher order. A control unit 22 includes selection means for selecting from the sort unit 21 a pair of sides a and b of the polygonal area, which are subjected to the interpolative computation, and therefore which are loaded into various units of the interpolation means. Further, the control unit 22 controls operation of these units.

The figure data of the selected sides a and b is fed to one-addition circuit 31, subtraction circuits 32 and 33, and vertical interpolation circuits 34 and 35. The one-addition circuit 31 incrementally adds a value "1" to an old vertical coordinate value to output a new vertical coordinate value yi=yij of the display points. The subtraction circuits 32 and 33 calculate pixel numbers of the sides a and b, respectively, along the vertical direction. The vertical interpolation circuit 34 is composed of interpolation units 41–47 for executing the vertical interpolative operation based on the figure data of the one side a and the outputs from the subtraction circuit 32, so as to calculate various values associated with one end points of the horizontal segments i along the side a. The other vertical interpolation circuit 35 is composed of interpolation units 51–57 for executing the vertical interpolative operation based on the figure data of the other side b and the outputs from the subtraction circuit 33, so as to calculate various values associated with the other end points of the respective horizontal segments i.

The outputs from the vertical interpolation circuits 34 and 35 are fed to one-addition circuit 61, subtraction circuit 62, and horizontal interpolation circuit 63. The one-addition circuit 61 increments the horizontal coordinate value xai of the left end point of the horizontal segment i starting from the side a so as to successively output a current horizontal coordinate value xij of the display points. The subtraction circuit 62 calculates a number of pixels aligned in the horizontal segment i. The horizontal interpolation circuit 63 is composed of interpolation units 71–76 for executing the horizontal interpolation operation based on the data of the horizontal segment i and the outputs from the subtraction circuit 62, so as to calculate various values associated with the display points on the horizontal segment i.

A texture memory 81 stores pattern data in the form of a texture color code value which is used for imparting a desired texture to an object surface, and which is mixed to the initial color code value. The texture memory 81 has an address input port which receives the u-v coordinate values uij and vii of the texture points in the texture plane, which are provided from the interpolation units 75 and 76 of the horizontal interpolation circuit 63. A multiplication circuit 82 receives both of the interpolated color code values rij, gij and bij outputted from the units 72–74 of the horizontal interpolation circuit 63 and the texture color code values r"ij, g"ij and b"ij read from the texture memory 81. The multiplication circuit 82 multiplies the interpolated color code value and the texture color code value with each other to synthesize final or composite color code values f"ij, g"ij and g"ij which represent shading by illumination or the like. A frame memory (not shown) stores the synthesized color code value together with z coordinate value zij outputted from the unit 71 of the horizontal interpolation circuit 63 at addresses designated by the x-y coordinate values xij and yij of the display points in the display plane.

Figure 4:
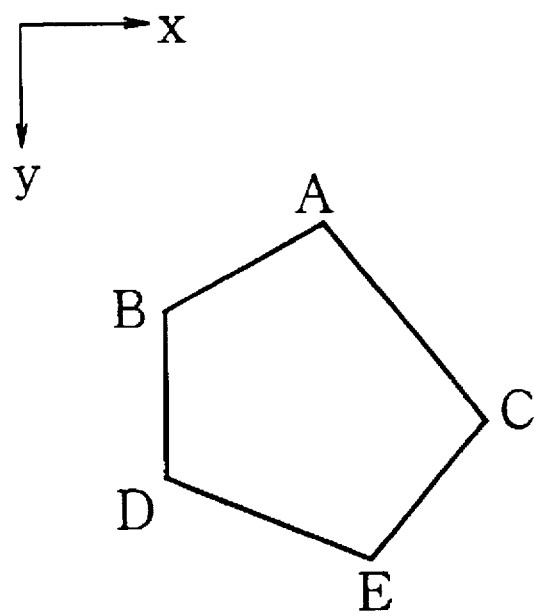
FIG. 4 is a geometric diagram showing vertexes of a polygonal area, sorted by the inventive apparatus.

In the above construction, upon the receipt of the figure data, the sort unit 21 sorts the vertexes of the convex polygonal area represented by the figure data, in terms of their y coordinate values of the display plane from the lower order to the higher order. By this sorting, for example as shown in FIG. 4, the vertexes of the polygonal area are labeled sequentially by A, B, C, D and E in the order of small to great values of the y coordinates. The sort unit 21 internally processes the figure data to determine a sequence of selecting sides of the convex polygonal shape based on the vertical positional relationship of these vertexes and to hold the figure data of the respective sides in the order of the selecting sequence.

Figure 5:
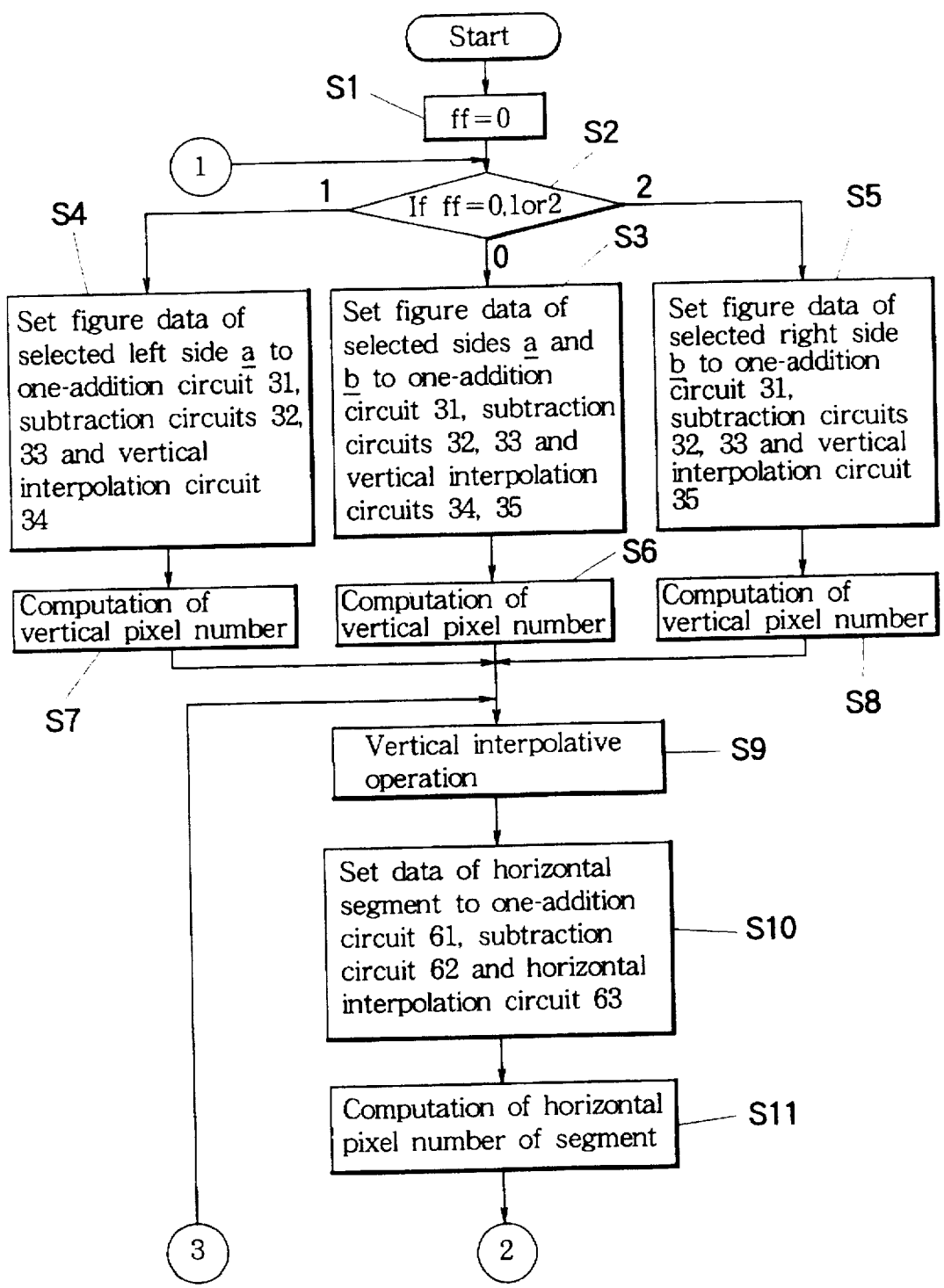
FIG. 5 is a flowchart showing operation of a control unit in the inventive apparatus.
Figure 6:
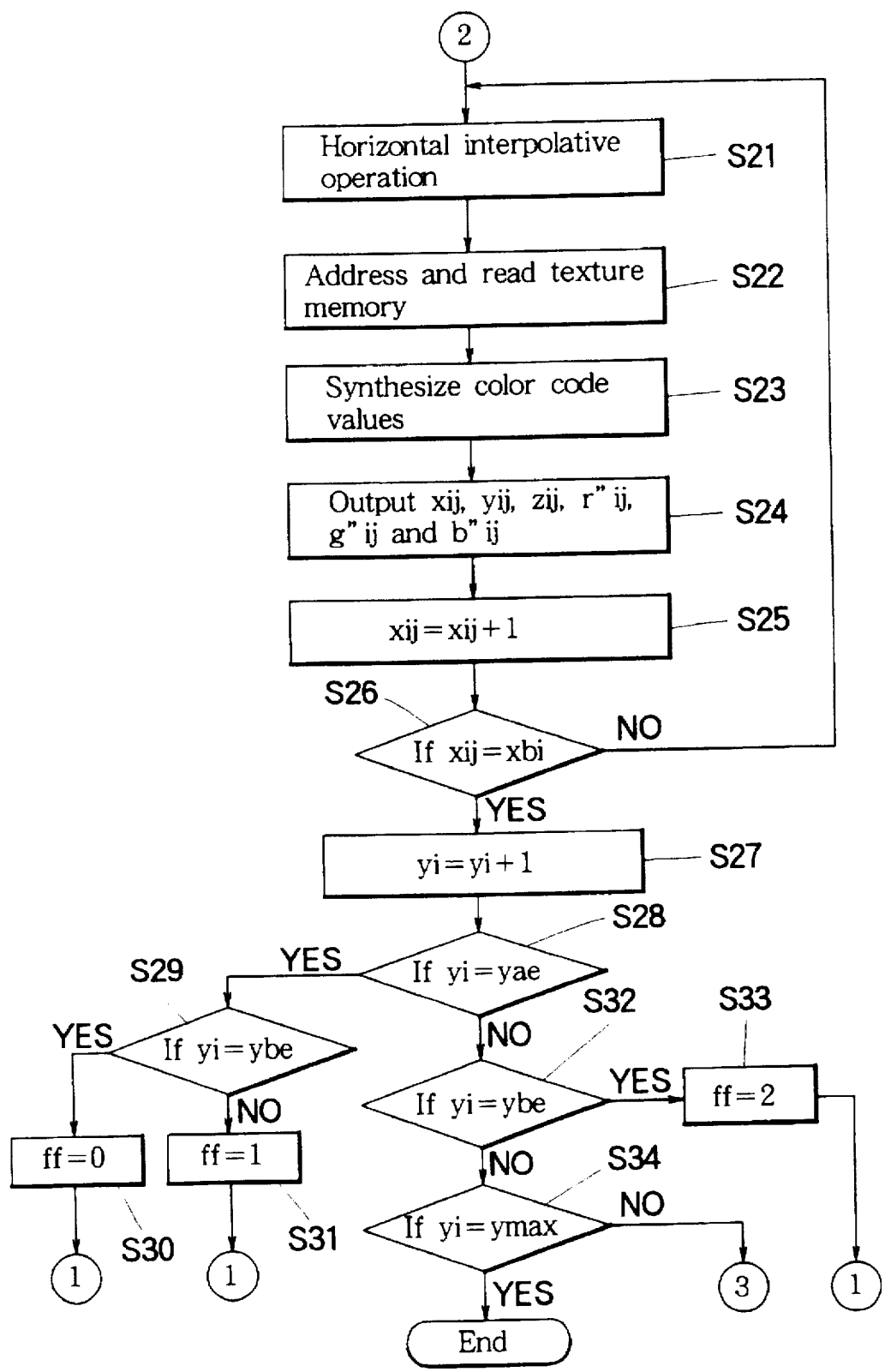
FIG. 6 is a subsequent flowchart showing the operation of the control unit.
Figure 7A:
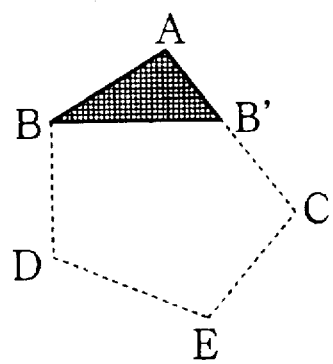
FIGS. 7A–7D are illustrative diagrams showing parallel zones sequentially processed by the inventive apparatus.
Figure 7B:
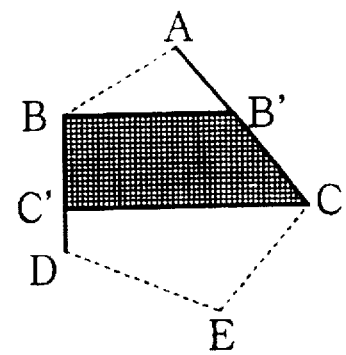
Figure 7C:
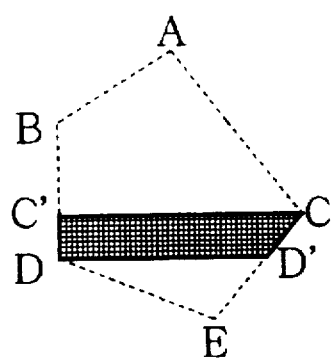
Figure 7D:
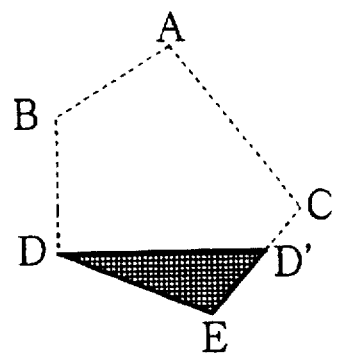

FIGS. 5 and 6 are a flowchart showing the operation of the control unit 22. At the start of the texture mapping process, the control unit 22 selects a first pair of the sides a and b to be processed. Thereafter, the control unit 22 sequentially and provisionally processes selected sides, and then retrieves the figure data of the selected sides from the sort unit 21. In the initial state, Step S1 is undertaken to set "0" to a flag ff which specifies a particular side to be selected. Then, Step S2 is undertaken to check the flag ff to thereby proceed to Step S3. In this step, the figure data related to the first pair of the sides a and b is set to one-addition circuit 31, subtraction circuits 32 and 33, and vertical interpolation circuits 34 and 35. Subsequently in Step S6, the subtraction circuits 32 and 33 compute the vertical pixel number (vertical length) of the respective sides a and b, and the vertical pixel number (vertical height) of the triangular or trapezoidal zone to be processed. Then, in Step S9, the vertical interpolation circuits 34 and 35 execute the vertical interpolative operation or segment operation to determine the horizontal segment. In Step S10, the data of the determined horizontal segment is set to one-addition circuit 61, subtraction circuit 62 and horizontal interpolation circuit 63. Further, in Step S11, the subtraction circuit 62 counts the pixel number of the horizontal segment. Subsequently in Step S21, the horizontal interpolative operation or point operation is executed based on the counted pixel number to determine the display point and the corresponding texture point along the horizontal segment. Then, in Step S22, the texture memory 81 is addressed by the coordinate values uij and vii of the texture point in the texture plane to read out therefrom the texture color code value. In Step S23, the multiplication circuit 82 synthesizes the composite color code value. In Step S24, the composite color code values r"ij, g"ij and b"ij are outputted to the frame memory together with the remaining interpolated values including zij and address xij and yij.

After the processing of one pixel is finished in the display plane, the horizontal coordinate value xij is incremented by one in Step S25. Then, the routine returns through Step S26 to Step S21 where a next display point is processed by the horizontal interpolative operation (point operation). If Step S26 judges that the current horizontal coordinate value xij reaches the right end coordinate value xbi, the vertical coordinate value yi is incremented by one in Step S27. Consequently, the routine returns through Steps S28, S32 and S34 to Step S9 where a next horizontal segment is processed by the vertical interpolative operation (segment operation). After repeating this routine, if it is judged by. Steps S28 and S29 that the vertical coordinate value yi concurrently reaches yae and ybe, the first pair of the sides a and b are concurrently finished so that the flag ff is set to "0" Step S30 in order to select a next pair of sides a and b, thereby returning to Step S2. Otherwise, if it is judged by Steps S28 and S29 that the vertical coordinate value yi only reaches yae, the flag ff is set to "1" in Step S31 in order to select a new left side a, thereby returning to Step S2. In similar manner, if it is judged by Steps S28 and S32 that the vertical coordinate value yi coincides with only ybe, the flag ff is set to "2" in Step S38 so as to select a new right side b, thereby returning to Step S2.

In case of ff=0, the next pair of the sides a and b are processed by Steps S3 and S6 in manner similar to the first pair of the sides. In case of ff=1, the figure data of the next left side a is set to one-addition circuit 31, subtraction circuits 32 and 33, and vertical interpolation circuit 34 in Step S4. Further, in Step S7, subtraction circuits 32 and 33 compute the vertical pixel number associated to the newly set side and the vertical pixel number of a next triangular or trapezoidal zone defined between the new left side a and the old right side b. In case of ff=2, the figure data of the next right side b is set to one-addition circuit 31, subtraction circuits 32 and 33, and vertical interpolation circuit 35 in Step S5. Subsequently, Step S8 is undertaken to compute the vertical pixel number of the new right side b and of a next zone in manner similar to Step S7. Finally, if it is judged by Step S34 that the vertical coordinate value yi reaches a maximum value ymax, the routine is ended.

As shown in FIGS. 7A–7D, by executing the operation as described above, the sides of the convex polygonal area ABCDE are sequentially selected in the order of AB and AC, BD, CE, and DE. Accordingly, the convex polygonal shape is sequentially truncated by zone operation to provide parallel zones of triangle ABB' (FIG. 7A), trapezoid BB'C'C (FIG. 7B), trapezoid C'CDD' (FIG. 7C) and triangle DD'E (FIG. 7D), which are processed by the segment and point operations in this order to thereby map the texture pattern on the polygonal area ABCDE shown in FIG. 4.

Figure 8A:
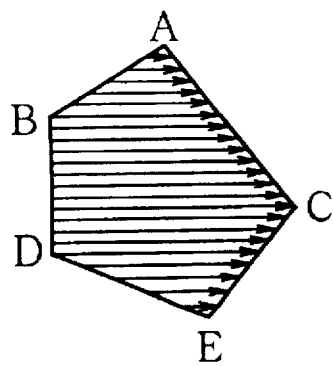
FIGS. 8A and 8B are illustrative diagrams showing an arrangement of pixels in the inventive apparatus.
Figure 8B:
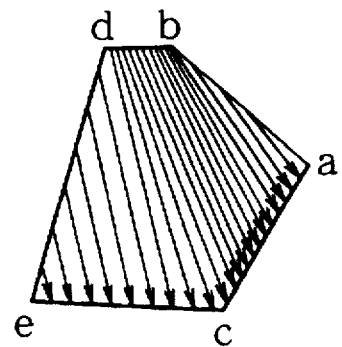

As shown in FIG. 8A, the segment and point operations are conducted in the horizontal and vertical directions identical to scanning directions of the pixels such as a raster scanning direction, thereby realizing the real time operation of the texture mapping. FIG. 8B illustrates the direction of the segment and point operations in the texture plane corresponding to the display plane shown in FIG. 8A. By such a manner, according to the present embodiment, the texture mapping is conducted line-sequentially in correspondence with rows of the pixels in the display plane, thereby avoiding omission and duplication of the dots.

Figure 9:
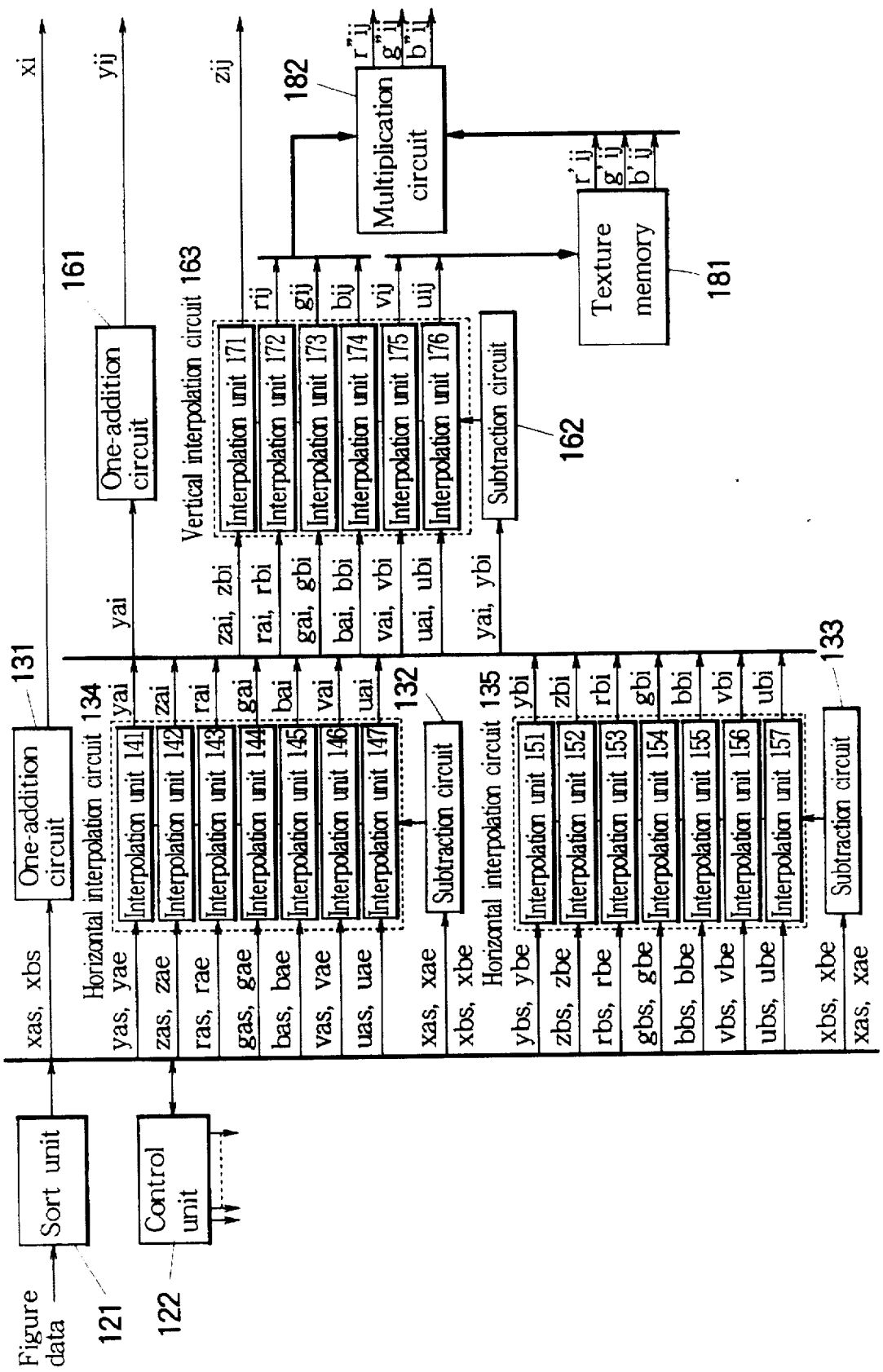
FIG. 9 is a block diagram showing another embodiment of the inventive texture mapping apparatus.

In the above described embodiment, the segment interpolative operation is conducted in the vertical direction, and then the point interpolative operation is conducted in the horizontal direction. Alternatively, as shown in FIG. 9, the segment interpolative operation can be first executed in the horizontal direction, and then the point interpolative operation can be executed in the vertical direction. In such a case, the vertical interpolation circuits 34 and 35 of FIG. 8 are replaced by horizontal interpolation circuits 134 and 135, and the horizontal interpolation circuit 63 is replaced by vertical interpolation circuit 163. Further, x and y are interchanged with each other as well as u and v in the interpolation formulae. Moreover, the sort unit 121 is modified to sort the vertexes of the polygonal area in terms of the x coordinate values, and to select a pair of sides which are vertically opposed to each other.

In the present embodiment, the interpolative operation is executed in one-to-one correspondence to the dots. Alternatively, the constants m and n in the formulae (5) and (6) may be set to other than "1" so that the interpolative operation can be executed at a pitch of two or more dots. Even in such a case, the interpolation is executed in the vertical and horizontal directions at a constant pitch in the display plane, thereby realizing the smooth texture mapping. In addition, the inventive operation can be applied to other polygons than the convex polygon by modifying the selection scheme of the polygon sides by the sort unit 21. Further, the interpolation units can be commonly utilized for different circuits if necessary or desired in view of required performance and limit of circuit scale. The interpolation process of the color code value can be replaced by interpolation process of the luminance value.

As described above, according to the invention, the interpolation circuits compute the various values or information of the internal points within the polygonal area by the vertical and horizontal interpolative operations. Then, the texture memory is addressed by the corresponding points in the texture plane to read out the texture data, which is allocated to the corresponding points in the display plane. By such a manner, the inventive texture mapping apparatus advantageously improves the processing speed while avoiding duplicative computation of the graphic information for individual dots in the display plane.

What is claimed is:

1. A texture mapping apparatus for applying a texture pattern to a polygonal area of an object presented in a display plane, the display plane being defined to extend in lateral and longitudinal directions orthogonal to each other, the apparatus comprising:

memory means defined with a texture plane corresponding to the display plane for recording in the texture plane pattern data representative of the texture pattern;

zone operation means for truncating the polygonal area sequentially in the longitudinal direction to determine a set of parallel zones which extend along the lateral direction in the display plane, and to subsequently determine a set of corresponding zones in the texture plane;

segment operation means for interpolatively dividing each of the parallel zones in the longitudinal direction to determine a stripe of lateral segments which lie along the lateral direction within each parallel zone of the display plane, and to subsequently determine a group of corresponding segments within the corresponding zone of the texture plane;

point operation means for interpolatively dividing each of the lateral segments in the lateral direction to determine an array of display points arranged within the polygonal area in the display plane, and to subsequently determine an array of texture points in the texture plane, corresponding to the display points; and allocation means for reading out the pattern data recorded at the respective texture points from the memory means, and for allocating the read pattern data to the corresponding display points to map the texture pattern to the polygonal area.

2. The texture mapping apparatus according to claim 1, further comprising a matrix of pixels for displaying the object on the display plane such that horizontal rows of the pixels extend in one of the lateral and longitudinal directions and vertical columns of the pixels extend in the other of the lateral and longitudinal directions.

3. The texture mapping apparatus according to claim 2, wherein the point operation means includes means for determining the array of the display points in one-to-one correspondence to the matrix of the pixels.

4. The texture mapping apparatus according to claim 1, wherein the zone operation means includes means for selecting a pair of sides from the polygonal area to determine therebetween each parallel zone having either of a triangular shape and a trapezoidal shape, which has at least two vertexes coincident with two of four end points of the two selected sides.

5. A texture mapping apparatus for applying a texture pattern to a polygonal area of an object presented in a display plane, the display plane being defined to extend in lateral and longitudinal directions orthogonal to each other, the apparatus comprising:

memory means defined with a texture plane corresponding to the display plane for recording in the texture plane pattern data representative of the texture pattern;

zone operation means for truncating the polygonal area sequentially in the longitudinal direction to determine a set of parallel zones which extend along the lateral direction in the display plane, and to subsequently determine a set of corresponding zones in the texture plane;

segment operation means for interpolatively dividing each of the parallel zones in the longitudinal direction to determine a stripe of lateral segments which lie along the lateral direction within each parallel zone of the display plane, and to subsequently determine a group of corresponding segments within the corresponding zone of the texture plane;

point operation means for interpolatively dividing each of the lateral segments in the lateral direction to determine an array of display points arranged within the polygonal area in the display plane, and to subsequently determine an array of texture points in the texture plane, corresponding to the display points; and allocation means for reading out the pattern data recorded at the respective texture points from the memory means, and for allocating the read pattern data to the corresponding display points to map the texture pattern to the polygonal area, wherein the zone operation means includes means for selecting a pair of sides from the polygonal area to determine therebetween each parallel zone having either of a triangular shape and a trapezoidal shape, which has at least two vertexes coincident with two of four end points of the two selected sides, and the segment operation means includes means for determining the stripe of the lateral segments based on the selected pair of sides of the polygonal area.

* * * * *